US007778425B2

(12) United States Patent
Kajala et al.

(10) Patent No.: US 7,778,425 B2
(45) **Date of Patent: *Aug. 17, 2010**

(54) METHOD FOR GENERATING NOISE REFERENCES FOR GENERALIZED SIDELOBE CANCELING

(75) Inventors: Matti Kajala, Tampere (FI); Matti Hämäläinen, Lempäälä (FI); Ville Myllylä, Tampere (FI)

(73) Assignee: Nokia Corporation, Espoo (FI)

( * ) Notice: Subject to any disclaimer, the term of this patent is extended or adjusted under 35 U.S.C. 154(b) by 1705 days.

This patent is subject to a terminal disclaimer.

(21) Appl. No.: 10/745,945

(22) Filed: Dec. 24, 2003

(65) Prior Publication Data

US 2005/0149320 A1 Jul. 7, 2005

(51) Int. Cl.
*H04R 3/00* (2006.01)
*H04B 15/00* (2006.01)

(52) U.S. Cl. .......................................... 381/92; 381/93

(58) Field of Classification Search .................. 381/66, 381/92, 93, 317, 94.1
See application file for complete search history.

(56) References Cited

U.S. PATENT DOCUMENTS 4,741,038 A 4/1988 Elko et al.
6,049,607 A 4/2000 Marash et al.
6,449,586 B1 * 9/2002 Hoshuyama ................. 381/92
6,449,593 B1 9/2002 Valve ......................... 704/233

FOREIGN PATENT DOCUMENTS

EP 1 184 676 A1 3/2002

OTHER PUBLICATIONS

Nordebo S., Claesson I, Nordholm S. "Broadband Adaptive Beamforming: A Design Using 2-D Spatial Filters" Antennas and Propagation Society International Symposium, MI, USA 1993.
Kajala M., Hämäläinen M., MyllyläV., "A Method for Generating Noise References for Adaptive Sidelobe Cancelling", NRC Invention Report NC37098.
George-Othon Glentis, et al, Efficient Least Squares Adaptive Algorithms for FIR Transversal Filtering, IEEE Signal Processing Magazine, Jul. 1999 p. 13-41.
I. Claesson, S. Nordholm, "A Spatial Filtering Approach to robust Adaptive Beaming", IEEE Transactions on Antennas and Propagation, vol. 40, No. 9, Sep. 1992, pp. 1093-1096.

* cited by examiner

*Primary Examiner*—Ping Lee

(57) ABSTRACT

This invention describes a method for generating noise references for adaptive interference cancellation filters for applications in generalized sidelobe canceling systems. More specifically the present invention relates to a multi-microphone beamforming system similar to a generalized sidelobe canceller (GSC) structure, but the difference with the GSC is that the present invention creates noise references to the adaptive interference canceller (AIC) filters using steerable beams that block out the desired signal when the beam is steered away from the desired signal source location.

27 Claims, 7 Drawing Sheets

METHOD FOR GENERATING NOISE REFERENCES FOR GENERALIZED SIDELOBE CANCELING

CROSS-REFERENCE TO RELATED APPLICATION

This application discloses subject matter which is also disclosed and which may be claimed in co-pending, co-owned application Ser. No. 10/746,843 and 60/532,360 filed on even date herewith.

FIELD OF THE INVENTION

This invention generally relates to acoustic signal processing and more specifically to generating noise references for adaptive interference cancellation filters used in generalized sidelobe canceling systems.

BACKGROUND OF THE INVENTION

1. Field of Technology and Background

A beam, referred to in the present invention, is a processed output target signal of multiple receivers. A beamformer is a spatial filter that processes multiple input signals (spatial samples of a wave field) and provides a single output picking up the desired signal while filtering out the signals coming from other directions. The term adaptive beamformer refers to a well-known generalized sidelobe canceller (GSC), which is a combination of a beamformer providing the desired signal output and an adaptive interference canceller (AIC) part that produces noise estimates that are then subtracted from the desired signal output further reducing any ambient noise left there on the desired signal path. Desired signal is, e.g. a speech signal coming from the direction of the source and noise signals are all other signals present in the environment including reverberated components of the desired signal. Reverberation occurs when a signal (acoustical pressure wave or electromagnetic radiation) hits an obstacle and changes its direction, possibly reflecting back to the system from another direction.

2. Problem Formulation

Major problem in prior-art GSC adaptive filtering is the desired signal leakage to the adaptive filters that causes desired signal deterioration in the system output. Also, when the target is moving, the beam direction must be changed accordingly requiring calculation of a new blocking matrix or using pre-steering as described by Claesson and Nordholm, "A Spatial Filtering Approach to Robust Adaptive Beaming", IEEE Trans. on Antennas and Propagation, Vol. 40, No. 9, September 1992. In prior-art systems steering is typically not considered and the beamformer is assumed to point in only one known fixed look (target) direction.

3. Prior Art

In conventional GSCs, it can be possible to try preventing a desired signal cancellation by restricting the performance of the adaptive filters (e.g. leaky LMS, least-mean-square) and/or widening the spatial angle used for blocking.

Prior-art solutions are sub-optimal in a sense that they (e.g., leaky LMS adaptive filters) may not provide as good interference cancellation as would be possible without restricting the performance of the adaptive filter. Also, the blocking matrix is conventionally formed as a filter that is calculated as a complement to the beamforming filter and, therefore, changing the look (target) direction of the beamformer requires typically a rather exhaustive recalculation of the complementary filter when the desired signal source moves around. On the other hand, complementary filters could be stored in a memory, which requires that filter coefficients are stored separately for each look (target) direction. In that case, the actual look (target) direction of the beamformer is restricted to the look directions obtained from the pre-calculated filters in the memory. One more alternative is to use pre-steering of the array signals towards the desired signal source (the desired signal is in-phase on all channels). However, pre-steering requires either analog delays or digital fractional delay filters, which, in turn, are rather long and therefore complex to implement.

SUMMARY OF THE INVENTION

The object of the present invention is to provide a novel method for providing noise references for adaptive interference cancellation filters used in generalized sidelobe canceling systems.

According to a first aspect of the present invention, a method for generating noise references for generalized sidelobe canceling comprises the steps of: receiving an acoustic signal by a microphone array with M microphones for providing corresponding M microphone signals or M digital microphone signals, wherein M is a finite integer of at least a value of two; generating each of T+1 intermediate signals in response to the M microphone signals or to M digital microphone signals by a corresponding one of T+1 pre-filters and providing said T+1 intermediate signals to each of N noise post-filters, said T+1 pre-filters and N noise post-filters are comprising components of a beamformer, wherein T is a finite integer of at least a value of one, and N is a finite integer of at least a value of one; generating N noise control signals by a beam shape control block of the beamformer and providing each of said N noise control signals to a corresponding one of the N noise post-filters, respectively; and generating N noise reference signals by the N noise post-filters and providing each of said noise reference signals to a corresponding one of N adaptive filter blocks of an adaptive interference canceller, respectively, for providing an output target signal using said generalized sidelobe canceling method.

In further accord with the first aspect of the invention, prior to the step of generating the T+1 intermediate signals, the method may further comprise the step of converting the M microphone signals of the microphone array to the M digital microphone signals using an A/D converter and providing said M digital microphone signals to the beamformer.

Still further according to the first aspect of the invention, the method may further comprise the step of generating a direction of arrival signal or an external direction of arrival signal and optionally N noise direction signals or N external direction signals and providing said direction of arrival signal or said external direction of arrival signal and optionally said N noise direction signals or N external direction signals to the beam shape control block. Further, the step of generating the T+1 intermediate signals may also include providing said T+1 intermediate signals to a speaker and noise tracking block. Still further, the direction of arrival signal and optionally N noise direction signals may be generated and provided to the beam shape control block by the speaker and noise tracking block. Yet still further, in alternative embodiment, the external direction of arrival signal and optionally the N external noise direction signals may be generated and provided to the beam shape control block by an external control signal generator instead of the speaker and noise tracking block.

Further still according to the first aspect of the invention, after the step of generating the T+1 intermediate signals, the method may further comprise the step of generating a direction of arrival signal and optionally N noise direction signals by the speaker and noise tracking block and providing said direction of arrival signal and optionally said N noise direction signals to the beam shape control block.

In further accordance with the first aspect of the invention, the step of generating said T+1 intermediate signals may further include providing said T+1 intermediate signals to a target post-filter and wherein the step of generating the N noise control signals may further include generating a target control signal by the beam shape control block and providing said target control signal to the target post filter, said method may further comprise the step of generating a target signal by the target post-filter and providing said target signal to an adder of the adaptive interference canceller. Still further, the method may further comprise the step of generating N noise cancellation adaptive signals by the corresponding N adaptive filter blocks and providing said N noise cancellation adaptive signals to the adder; and generating the output target signal using the adder by subtracting the N noise cancellation adaptive signals from the target signal. Yet still further, the output target signal may be provided to each of the N adaptive filter blocks for continuing an adaptation process and for generating a further value of the output target signal.

Yet further still according to the first aspect of the invention, N may be equal to one.

According still further to the first aspect of the invention, the generalized sidelobe canceling method may be implemented in a frequency domain, or in a time domain or in both the frequency and the time domain.

According to a second aspect of the invention, a generalized sidelobe canceling system comprises: a microphone array containing M microphones, responsive to an acoustic signal, for providing M microphone signals, wherein M is a finite integer of at least a value of two; a beamformer, responsive to the M microphone signals or to M digital microphone signals, for generating T+1 intermediate signals, for generating N noise control signals and for providing N noise reference signals, wherein T is a finite integer of at least a value of one, and N is a finite integer of at least a value of one; and an adaptive interference canceller, responsive to the N noise reference signals, for providing an output target signal of the generalized sidelobe canceling system.

According further to the second aspect of the invention, the beamformer may be a polynomial beamformer.

Further according to the second aspect of the invention, N may be equal to one.

Still further according to the second aspect of the invention, the generalized sidelobe canceling system further comprises an A/D converter, responsive to the M microphone signals, for providing the M digital microphone signals.

According further still to the second aspect of the invention, the beamformer may comprise: a beam shape control block, responsive to a direction of arrival signal or to an external direction of arrival signal and optionally to N noise direction signals or to N external noise direction signals, for providing a target control signal and the N noise control signals. Further still, the beamformer may further comprise: T+1 pre-filters, each responsive to each of the M digital microphone signals, for providing the T+1 intermediate signals. Yet further, the generalized sidelobe canceling system may further comprise: a speaker and noise tracking block, responsive to the T+1 intermediate signals, for providing the direction of arrival signal and optionally the N noise direction signals. Yet still further, the beamformer may further comprise: a target post filter, responsive to the T+1 intermediate signals and to the target control signal, for providing a target signal; and N noise post-filters, each responsive to the T+1 intermediate signals and to a corresponding one of the N noise control signals, each for providing a corresponding one of the N noise reference signals. Yet still further, the generalized sidelobe canceling system instead of the speaker and noise tracking block may further comprise an external control signal generator, for providing the external direction of arrival signal and optionally the N external noise direction signals.

Yet still further according to the second aspect of the invention, the adaptive interference canceller may comprise: N adaptive filter blocks, each responsive to a corresponding one of the N noise reference signals and to the output target signal, each for providing a corresponding one of N noise cancellation adaptive signals; and an adder, responsive to the target signal and to the N noise cancellation adaptive signals, for providing the output target signal.

Yet further still according to the second aspect of the invention, the generalized sidelobe canceling system may be implemented in a frequency domain, or in a time domain or in both the frequency and the time domain.

According to a third aspect of the invention, a method for generating noise references for generalized sidelobe canceling comprises the steps of: receiving an acoustic signal by a microphone array with M microphones for providing corresponding M microphone signals or M digital microphone signals, respectively, wherein M is a finite integer of at least a value of two; generating each of T intermediate signals in response to the M microphone signals or to the M digital microphone signals by a corresponding one of T+1 pre-filters of a beamformer and providing said T+1 intermediate signals to each of N×K noise post-filters, said T+1 pre-filters and said N×K noise post-filters are comprising components of the beamformer, wherein T is a finite integer of at least a value of one, K is a finite integer of at least a value of one and N is a finite integer of at least a value of one; generating N of N×K noise control signals by each of K beam shape control blocks of a beamformer, respectively, and providing each of said noise control signals to a corresponding one of the N×K noise post-filters, respectively; and generating each of N×K noise reference signals by a corresponding one of the N×K noise post-filters and providing each of said noise reference signals to a corresponding one of N×K adaptive filters of a corresponding one of K adaptive interference cancellers, respectively.

In further accord with the third aspect of the invention, prior to the step of generating the T+1 intermediate signals, the method may further comprise the step of converting the M microphone signals of the microphone array to the digital microphone signals using an A/D converter and providing said M digital microphone signals to the beamformer.

Still further according to the third aspect of the invention, the step of generating the T+1 intermediate signals may further include providing said T+1 intermediate to each of K target post-filters and the step of generating said N of the N×K noise control signals by each of the K beam shape control blocks, respectively, may further include generating each of K target control signals by a corresponding one of the K beam shape control blocks and providing each of said K target control signals to a corresponding one of the K target post-filters, said method may further comprise the step of generating each of K target signals by a corresponding one of the K target post-filters and providing each of said K target signals to a corresponding one of K adders of a corresponding one of the K adaptive interference cancellers, respectively. Still further, the method may comprise the steps of: generating each of N×K noise cancellation adaptive signals by the corresponding one of the N×K adaptive filter blocks; providing each of said N×K noise cancellation adaptive signals to the corresponding one of the K adders with the same index K; and generating K output target signals using the K adders by subtracting each of the N×K noise cancellation adaptive signals with the index K from a corresponding one of the K target signals with the same index K, respectively. Yet further still, each of the K output target signals may be provided to each of the N×K adaptive filter blocks with the index K, respectively, for continuing an adaptation process and for generating further values of the K output target signals.

Yet further still according to the third aspect of the invention, N may be equal to one. Further, the beamformer may be a polynomial beamformer.

According still further to the third aspect of the invention, the generalized sidelobe canceling method may be implemented in a frequency domain, or in a time domain or in both the frequency and the time domain.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a method for generating noise references for adaptive interference cancellation filters for applications in generalized sidelobe canceling systems. Said noise reference signals in turn are used for generating noise estimating signals using said adaptive interference cancellation filters, followed by subtracting said noise estimate signals from the desired signal path, thus providing further noise reduction in the system output. More specifically the present invention relates to a multi-microphone beamforming system similar to a generalized sidelobe canceller (GSC) structure, but the difference with the GSC is that the present invention creates noise references to the adaptive interference canceller (AIC) filters using steerable beams that block out the desired signal when the beam is steered away from the desired signal source location.

When a desired signal source moves around, the beam direction needs to be changed. According to the present invention, using a polynomial beamformer in one possible scenario among others as described in European Patent No. 1184676 "A method and a Device for Parametric Steering of a Microphone Array Beamformer" by M. Kajala and M. Hämäläinen (corresponding PCT Patent Application publication WO 02/18969), together with speaker tracking described in U.S. Pat. No. 6,449,593 "Method and System for Tracking Human Speakers" by P. Valve, the system knows the desired signal source direction and easily forms a new beam with corresponding noise reference signals by changing only a few parameter values in the system.

Figure 1:
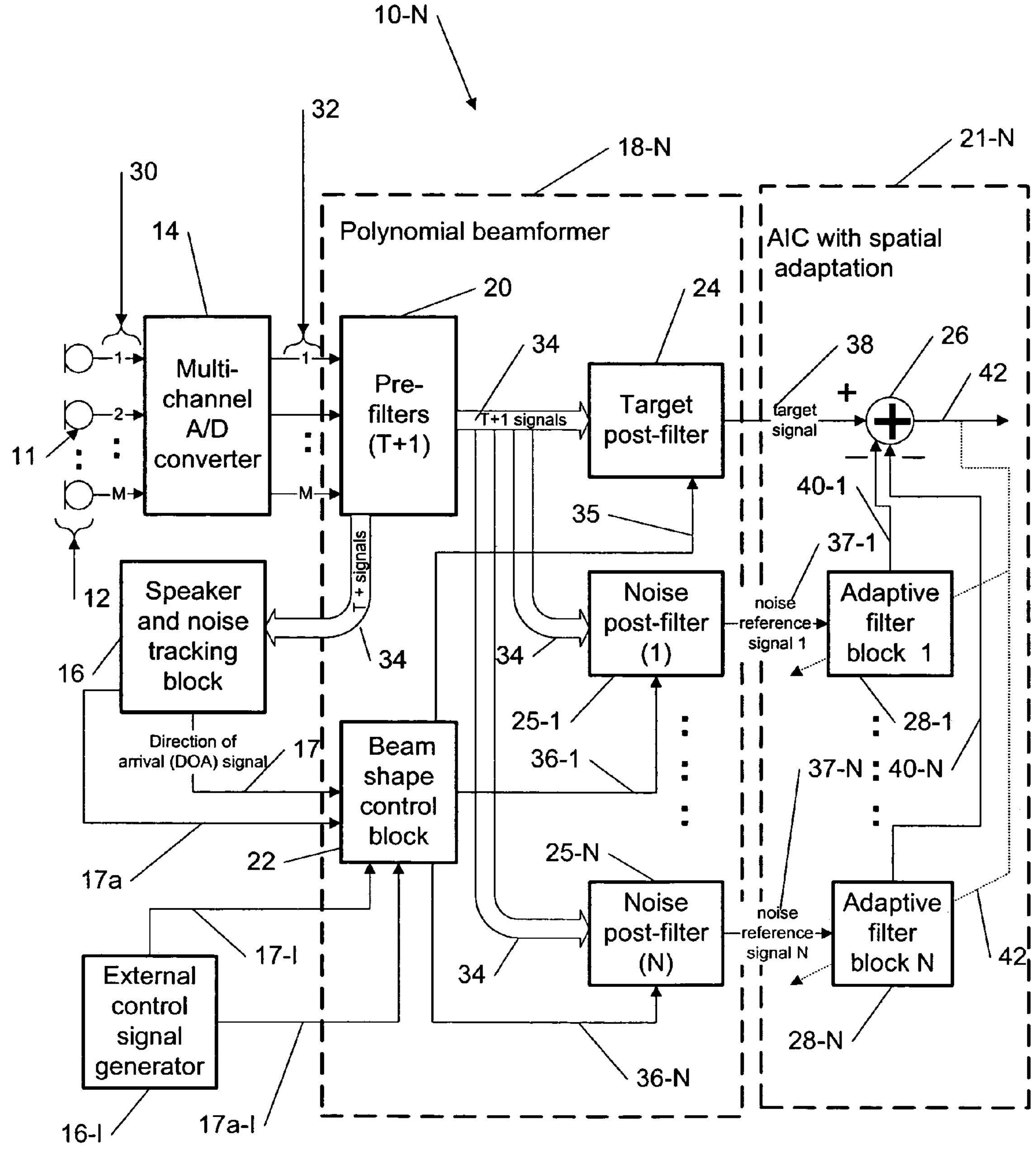
FIG. 1 is a block diagram representing an example of generalized sidelobe canceling using N reference noise signals, according to the present invention.

FIG. 1 is a block diagram representing one possible example among others of a generalized sidelobe canceling system 10-N using N reference noise signals, according to the present invention.

An acoustic signal 11 is received by a microphone array 12 with M microphones for generating M corresponding microphone (electro-acoustical) signals 30, wherein M is a finite integer of at least a value of two. Typically, the microphones in the microphone array 12 are arranged in a single array substantially along a horizontal line. However, the microphones can be arranged along a different direction, or in a 2D or 3D array. The M corresponding microphone signals 30 can be converted to digital signals 32 using an A/D converter 14 and each of said M digital microphone signals 32 is provided to each of T+1 pre-filters 20 of a polynomial beamformer 18-N, wherein T is a finite integer of at least a value of one. Operation of the polynomial beamformer 18-N and its components including T+1 pre-filters 20, a target post-filter 24, N noise post-filters 25-1, 25-2, . . . , 25-N, and a beam shape control block 22 are described in detail in European Patent No. 1184676 "A method and a Device for Parametric Steering of a Microphone Array Beamformer" by M. Kajala and M. Hämäläinen. (corresponding PCT Patent Application publication WO 02/18969).

Figure 4:
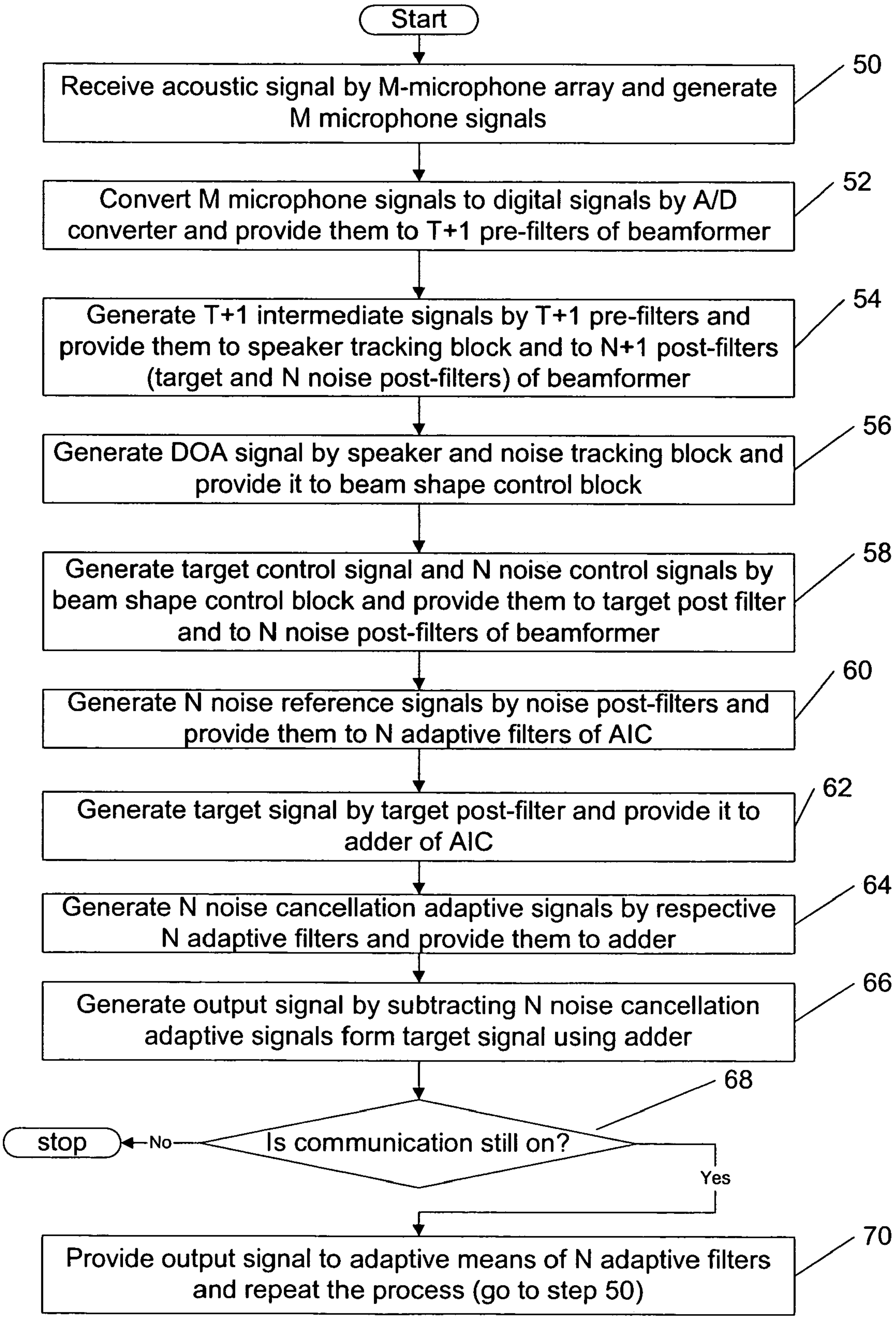
FIG. 4 shows a flow chart of generalized sidelobe canceling presented in FIG. 1, according to the present invention.

Thus, the performance of the polynomial beamformer 18-N and its components are incorporated here by reference (see FIG. 4 and operation of the beamformer 30-II of the above reference). The T+1 pre-filters 20 generate T+1 intermediate signals 34 in response to said M digital microphone signals 32 by the T+1 pre-filters 20 and provide T+1 intermediate signals 34 to the target post-filter 24 and to each of the N noise post-filters 25-1, 25-2, . . . , 25-N, said T+1 pre-filters 20, said target post-filter 24 and said noise post-filters 25-1, 25-2, . . . , 25-N are components of the beamformer 18-N, and N is a finite integer of at least a value of one. Said T+1 intermediate signals 34 are also provided to a speaker and noise tracking block 16 by the T+1 pre-filters 20.

The T+1 intermediate signals 34 still contain the spatial information of the M microphone signals 30 but in a different format. These T+1 intermediate signals 34 need to be further processed by the post-filters (24, 25-1, 25-2, . . . , 25-N) in order to achieve the signals that properly represent the look (target) directions specified by control signals (35, 36-1, 36-2, . . . 36-N) that are generated by a beam shape control block 22 as discussed below.

The performance of the speaker and noise tracking block 16 is described in U.S. Pat. No. 6,449,593 "Method and System for Tracking Human Speakers" by P. Valve and incorporated here by reference (see FIG. 3 of the above reference). The speaker and noise tracking block 16 is primarily used to select a favorable beam direction to track the speaker and the block 16 generates a direction of arrival (DOA) signal 17, and optionally (as discussed below) a noise direction signal 17*a* providing said direction of arrival signal 17 and optionally said noise direction signal 17*a* to the beam shape control block 22 (its performance is incorporated here by reference as stated above) of the polynomial beamformer 18-N. The speaker and noise tracking block 16 is able to trace a desired target signal source direction and optionally noise signal directions as discussed below. The beam shape control block 22 generates a target control signal 35 and N noise control signals 36-1, 36-2, . . . 36-N and provides said control signals 35, 36-1, 36-2, . . . 36-N to the target post-filter 24 and to the N noise post-filters 25-1, 25-2, . . . , 25-N, respectively.

There are other methods which can be used for generating the direction of arrival signal 17, as well as the noise direction signals 17*a*. It is noted that, according to the present invention, the location of the target signal source (and/or noise sources), i.e. forming the control signal 35 (and/or 36-1, 36-2, . . . 36-N), can be determined by checking the visual information obtained from a camera (if there is one attached to the system 10-N) or by any other means that can give the required information instead of using the speaker and noise tracking block 16. Alternatively, an external control signal generator 16-I can be used instead of the block 16 for generating an external direction of arrival signal 17-I and N external noise direction signals 17*a*-I instead of signals 17 and 17*a*, respectively. The difference is that the block 16-I operates independently and does not require said T+1 intermediate signals 34 for its operation.

Figure 2A:
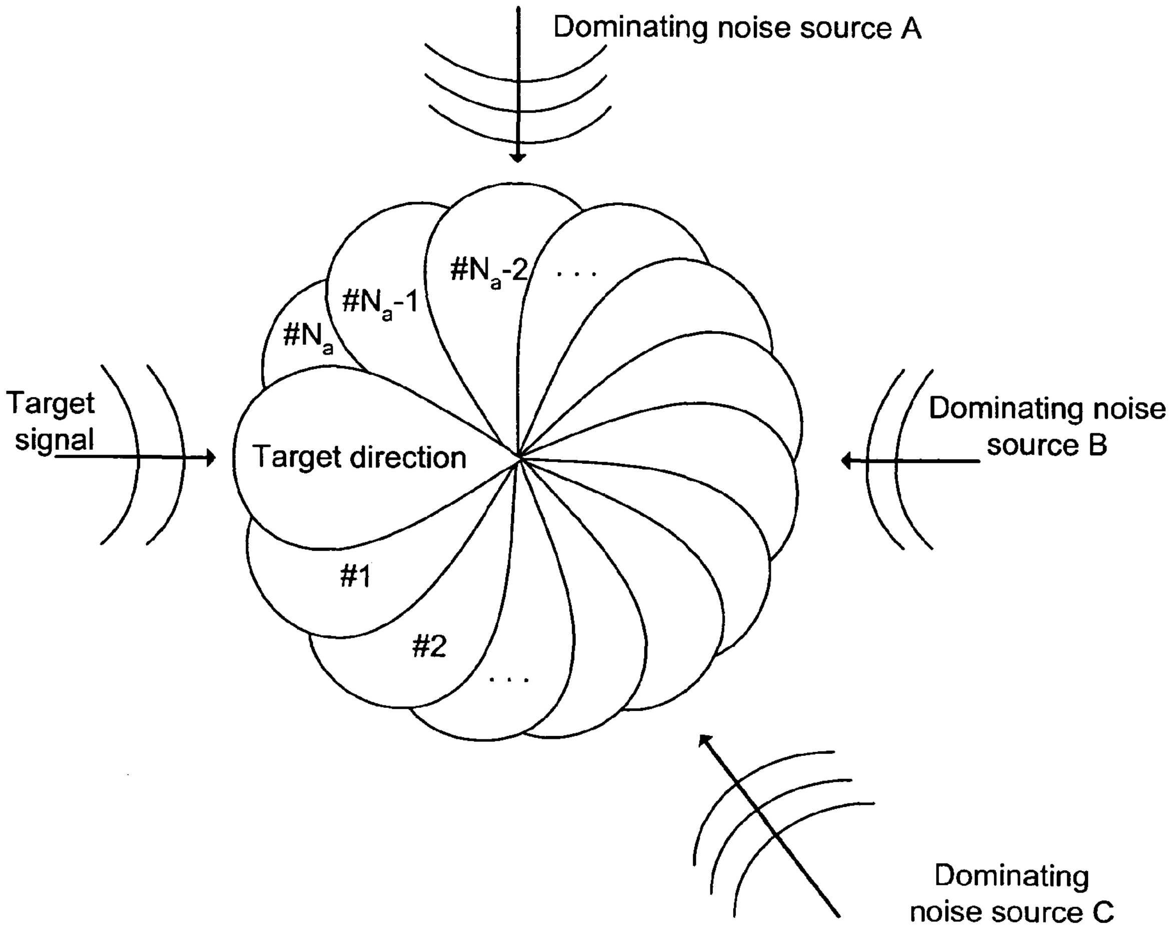
FIGS. 2*a*, 2*b* and 2*c* illustrate different examples of distribution of a target direction and noise reference directions, according to the present invention.
Figure 2B:
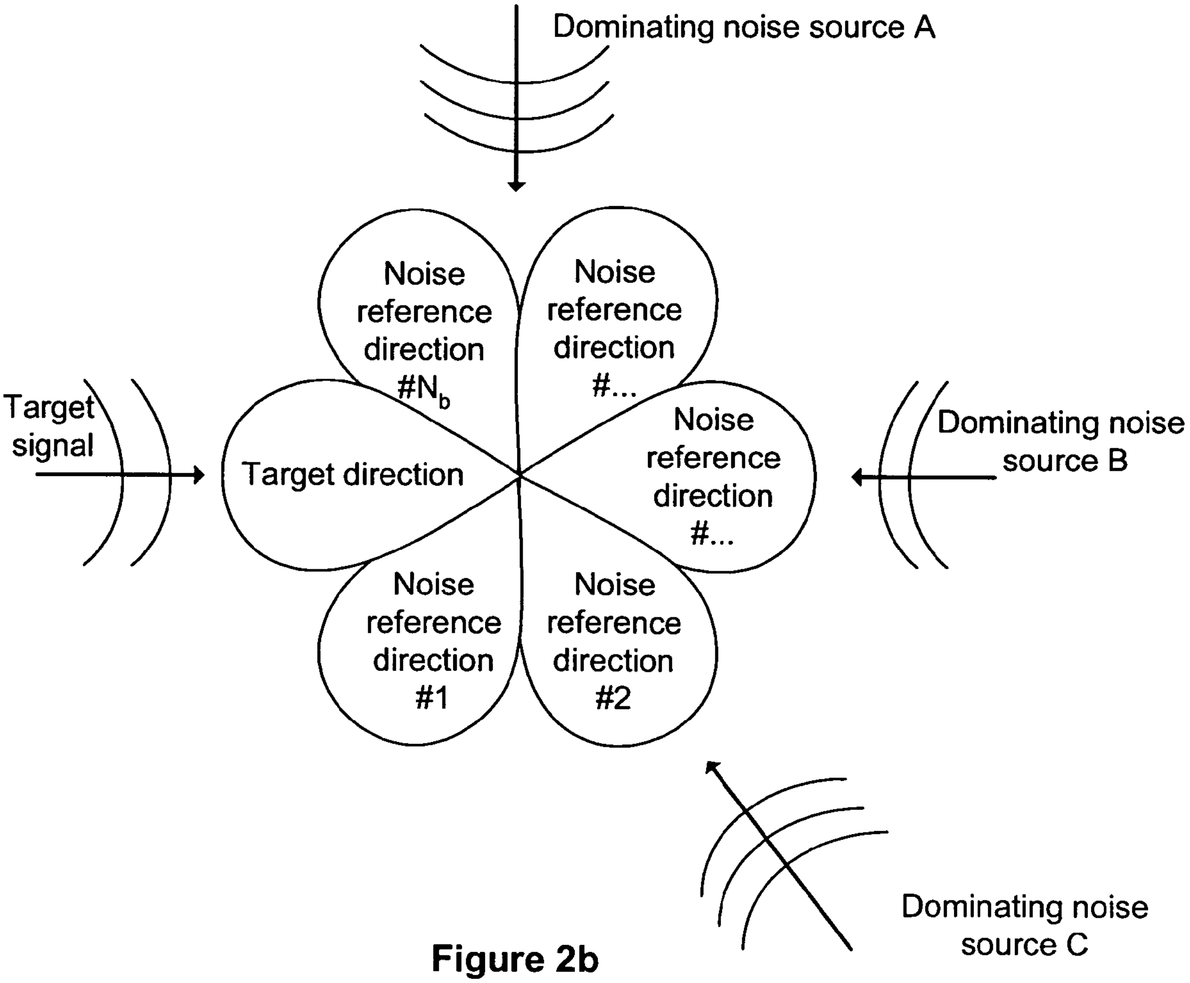

Noise reference direction estimation (the noise direction signals 17*a*) by the block 16 may not necessarily be needed, and therefore is optional according to the present invention, because the noise reference directions can be adjusted by generating N noise control signals 36-1, 36-2, . . . 36-N in accordance with the target signal direction (direction of arrival signal 17 or equivalent) in the beam shape control block 22 to cover the entire space of interest but steered away from a target direction as illustrated in FIG. 2*a* and discussed below. However, in some cases, e.g. if there exists external information about a strong interference direction, the use of the speaker and noise tracking block 16 (or alternatively the external source 16-I as described above) for generating the noise direction signals 17*a* (or signal 17*a*-I) can improve the noise cancellation performance of an adaptive interference canceller (AIC) 21-N. Also, generating signals 17*a* can be helpful if the entire space is not covered by the noise reference beams as shown in FIG. 2*b*, wherein a dominating noise source A happens to fall in between the two consequent noise reference beams in a uniformly distributed beam space. Further processing proceeds as described below.

The target post-filter 24 generates a target signal 38 using the target control signal 35 and provides said target signal 38 to an N+1 input adder 26 of the adaptive interference canceller 21-N. Each of the N noise post-filters 25-1, 25-2, . . . , 25-N generates a corresponding one of N noise reference signals 37-1, 37-2, . . . , 37-N, respectively, and provides said corresponding one of said N noise reference signals 37-1, 37-2, . . . , 37-N to a corresponding one of N adaptive filter blocks 28-1, 28-1, . . . , 28-N of the AIC 21-N, respectively. Said N noise reference signals 37-1, 37-2, . . . , 37-N are steered away from the direction of a desired signal and, thus, the desired signal content is suppressed (blocked) in said N noise reference signals 37-1, 37-2, . . . , 37-N. The N adaptive filter blocks 28-1, 28-1, . . . , 28-N generate corresponding N noise cancellation adaptive signals 40-1, 40-1, . . . , 40-N and provide these signals to the adder 26. The adder 26 generates the output target signal 42 of the generalized sidelobe canceling system 10 by subtracting the signals 40-1, 40-1, . . . , 40-N from the target signal 38 and providing the output target signal 42 as a feedback to coefficient adaptation blocks (not shown in FIG. 1) of the corresponding N adaptive filter blocks 28-1, 28-1, . . . , 28-N, thus accomplishing spatial-temporal adaptation of the AIC 21-N.

Note that having multiple parallel filters/blocks (25-1, 25-2, . . . , 25-N and 28-1, 28-1, . . . , 28-N) in FIG. 1 adds more degrees of freedom to adapt to different noise source directions. Also, instead of the parallel AIC 21-N, adaptive filters can be in sequence, but that may not work so well compared to the parallel structure.

As it is stated above, the information about the target signal direction (or target DOA) is determined by the block 16 or other means described above. However, it is important that the noise reference directions of the N noise post-filters (25-1, 25-2, 25-N) are steered away from that direction. One possibility for achieving said steering is to steer the noise reference directions uniformly (or with some predetermined fixed distribution) preferably opposite to the look (target) direction as shown in FIG. 2, according to the present invention. The other possibility is to use the speaker and noise tracking block 16 (or alternatively the block 16-I) to generate the noise control signals 17*a* and subsequently the N noise control signals 36-1, 36-2, . . . 36-N that are used for generating the N noise reference signals 37-1, 37-2, . . . , 37-N.

It is noted that the present invention demonstrated by the example of FIG. 1 can be implemented in a frequency domain or in a time domain or in both domains.

Figure 2C:
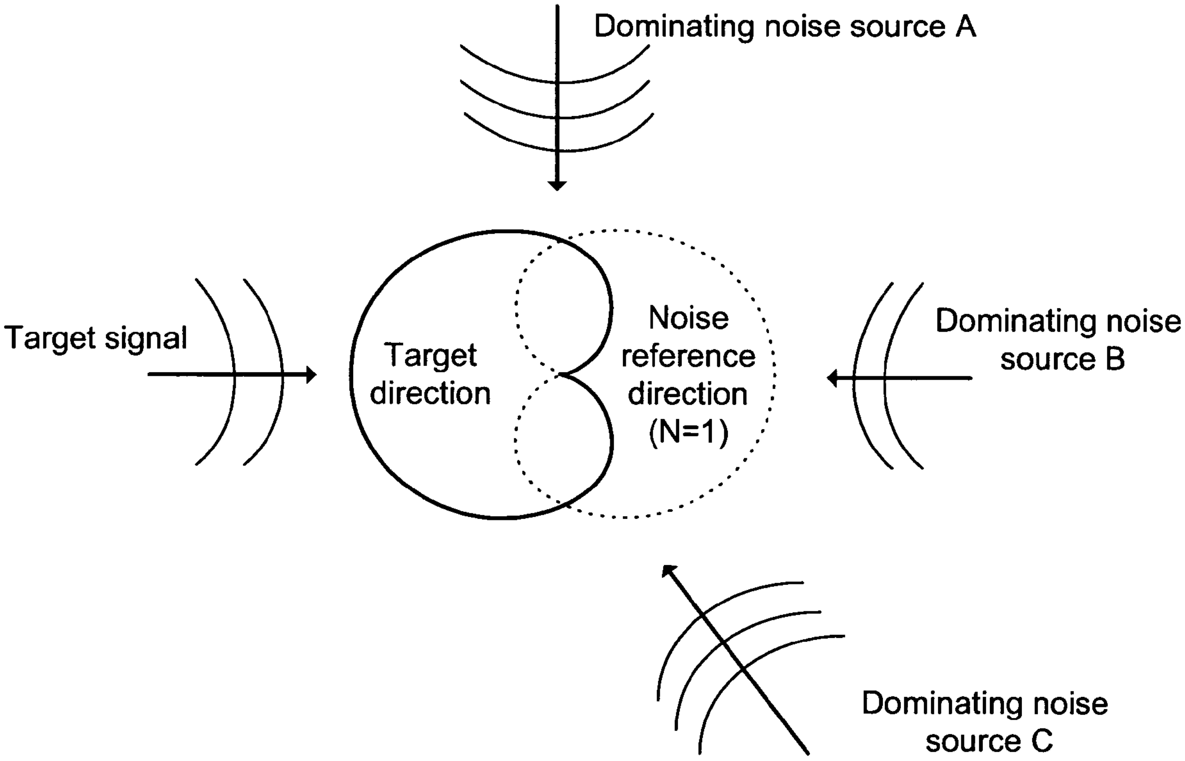

FIGS. 2*a*, 2*b* and 2*c* illustrate different examples of distribution of a target direction and noise reference directions, according to the present invention.

FIG. 2*a* gives an example of a uniform spatial distribution in 2D space of $N_a$ noise reference acoustical directions that cover the entire acoustical space around the microphone array 12. FIG. 2*a* shows a target acoustical signal, three dominating noise sources (A, B and C), target direction receiving sensitivity profile and N fixed noise reference direction sensitivity profiles (in relation to the detected target direction). Note that, for simplicity, the drawing does not show the sidelobes of the individual sensitivity patterns.

FIG. 2*b* is similar to 2*a*, but with a reduced coverage of $N_b$ ($N_b < N_a$) noise reference acoustical directions, wherein a spatial null appears in the direction of the noise source A. So, the noise source directions are not steered independently and it can be seen that, e.g. one noise source (the acoustical signal from the source A) falls between two noise reference beams and is not perhaps quite optimally picked-up.

FIG. 2*c* is an illustration of extremely reduced coverage of the noise reference acoustical directions having only one target signal direction and a single noise reference direction (N=1) and using a very simple cardioid sensitivity pattern for sound pick-up, according to the present invention. It can be seen that in this case the single noise reference signal does not spatially separate the noise sources A, B and C, but the resulting noise reference signal is still blocking the target signal, which is the major issue in the present invention.

One important consideration regarding the noise reference beams is the ability to block out the target signal, which is important to guarantee proper operation of the AIC block 21-N. Also, the set of N noise reference beams still approximately covers the entire space around the microphone array 12 in order to receive one or more actual noise source signals A, B, etc. As described above, if there exists external information about a strong interference direction (e.g., dominating noise sources A, B and/or C of FIGS. 2*a*, 2*b* and 2*c*), the use of the speaker and noise tracking block 16 for generating the noise direction signals 17*a* can improve the noise cancellation performance of an adaptive interference canceller block 21-N.

Figure 3:
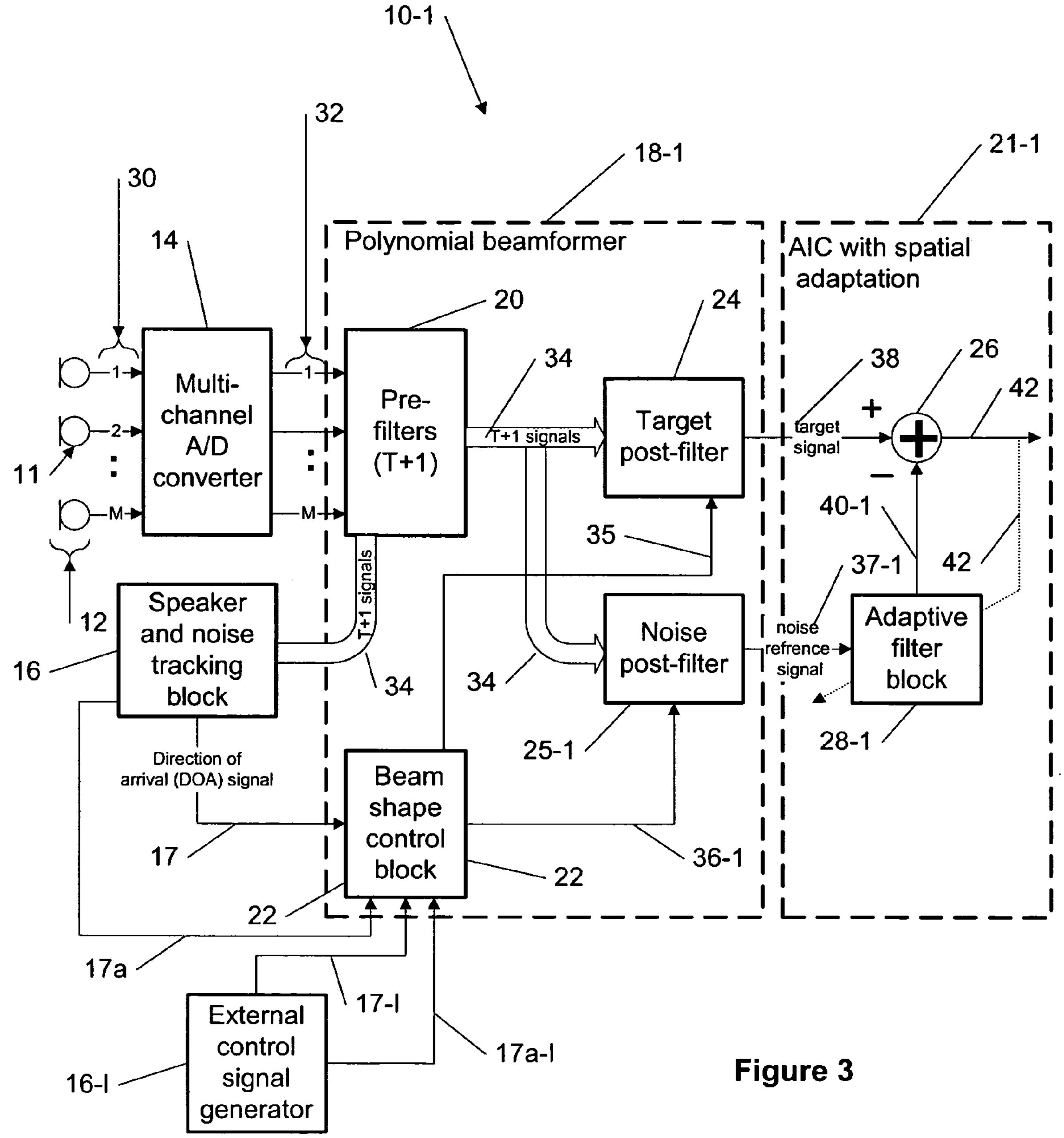
FIG. 3 is a block diagram representing an example of generalized sidelobe canceling using one reference noise signal, according to the present invention.

FIG. 3 is a block diagram representing one example, among others, of generalized sidelobe canceling using one reference noise signal, according to the present invention. Instead of the N noise post-filters 25-1, 25-2, . . . , 25-N and the N adaptive filter blocks 28-1, 28-1, . . . , 28-N, there are only one noise post-filter 25-1 and one adaptive filter block 28-1, respectively, which reduces computational complexity of the system.

FIG. 4 shows a flow chart of generalized sidelobe canceling presented in FIG. 1, according to the present invention. The flow chart of FIG. 4 only represents one possible scenario, among others. In a method according to the present invention, in a first step 50, the acoustic signal 11 is received by the M-microphone array 12 and the M microphone signals 30 are generated by said array 12. In a next step 52, the multi-channel A/D converter 14 converts the M microphone signals 30 to the digital microphone signals 32 and provides them to the T+1 pre-filters 20 of the polynomial beamformer 18-N.

In a next step 54, the T+1 intermediate signals 34 are generated by the T+1 pre-filters 20 of the beamformer 18-N and provided to the speaker and noise tracking block 16, to the target post-filter 24 and to each of the N noise post-filters 25-1, 25-2, . . . , 25-N, respectively. In a next step 56, the speaker and noise tracking block 16 generates the direction of arrival (DOA) signal 17 and optionally the N noise direction signals 17*a* and provides them to the beam shape control block 22. In a next step 58, the target control signal 35 and the N noise control signals 36-1, 36-2, . . . 36-N are generated by the beam shape control block 22 and provided to the target post-filter 24 and to the corresponding N noise post-filters 25-1, 25-2, . . . , 25-N of the beamformer 18-N, respectively. In a next step 60, the N noise reference signals 37-1, 37-2, . . . , 37-N are generated by the corresponding N post-filters 25-1, 25-2, . . . , 25-N and provided to the corresponding adaptive filter blocks 28-1, 28-1, . . . , 28-N of the AIC 21-N, respectively. In a next step 62, the target signal 38 is generated by the target post-filter 24 and provided to the adder 26 of the AIC 21-N. In a next step 64, the N noise cancellation adaptive signals 40-1, 40-1, . . . , 40-N are generated by the corresponding N adaptive filter blocks 28-1, 28-2, . . . , 28-N of the AIC 21-N. In a next step 66, the output target signal 42 is generated by the adder 26 by subtracting all N noise cancellation adaptive signals 40-1, 40-1, . . . , 40-N from the target signal 38. In a next step 68, it is ascertained whether the communication is still on. If that is not the case, the process stops. If, however, the communication is still on, in a next step 70, the output target signal 42 is provided as a feedback to the coefficient adaptation blocks (not shown in FIG. 1) of all of the N adaptive filter blocks 28-1, 28-1, . . . , 28-N and the process goes back to step 50.

Figure 5:
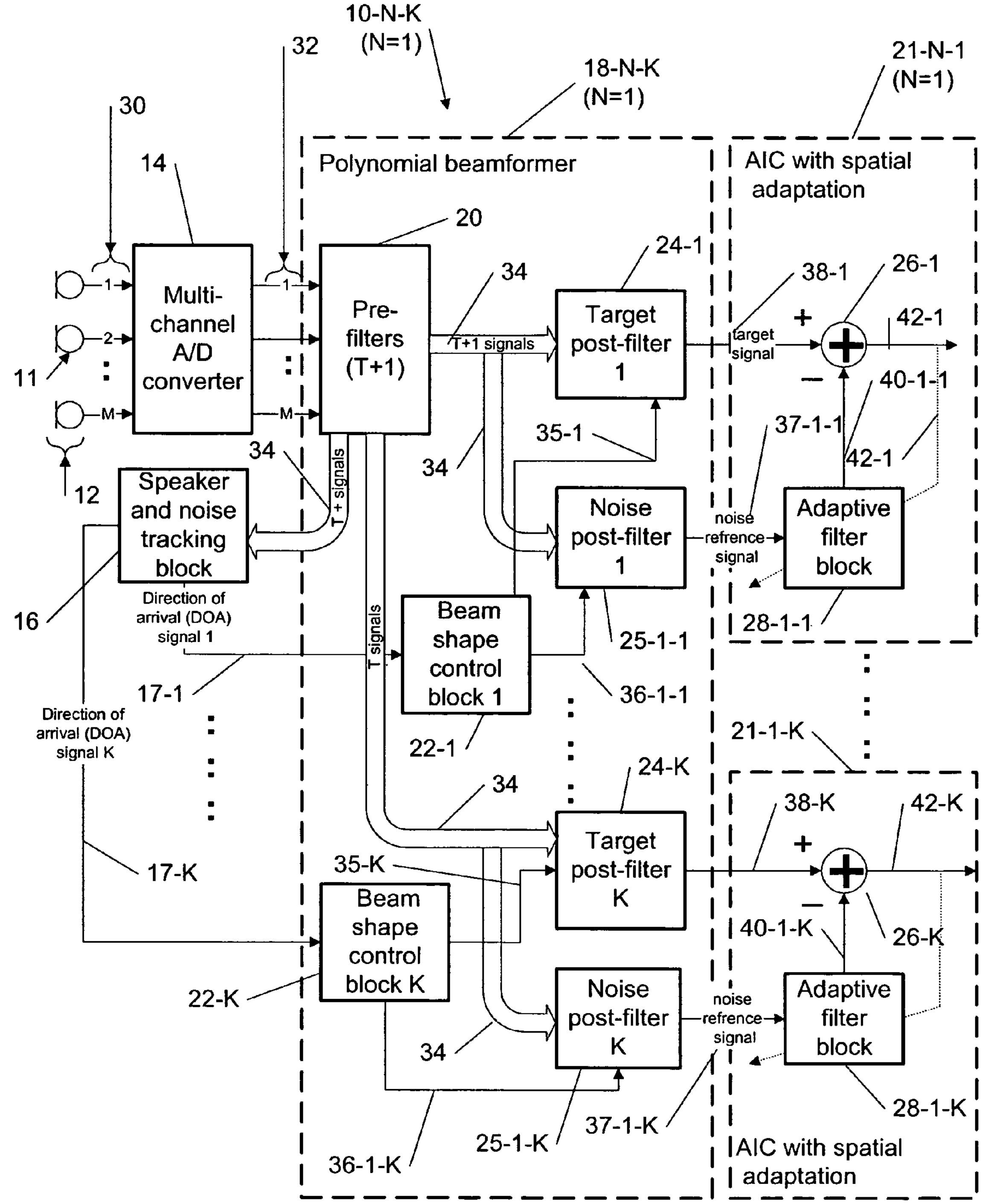
FIG. 5 is a block diagram representing an example of generalized sidelobe canceling using multi-target directional signals, according to the present invention.

Finally, FIG. 5 is a block diagram representing one example among others of generalized sidelobe canceling using multi-target directional signals, according to the present invention. The performance of the system of FIG. 5 is similar to the performance of the system of FIG. 3 (or FIG. 1 with N=1) except there are K signal target directions instead of one in the system of FIG. 3 (or FIG. 1 with N=1) (K is an integer of at least a value of one). The polynomial beamformer 18-N-K (N=1) of FIG. 5 has K target post-filters 24-1, 24-2, . . . , 24-K, N×K=K (N=1) noise post-filters 25-1-1, 25-2, . . . , 25-1-K and K beam shape control blocks 22-2, 22-1, . . . , 22-K. Also, instead of one, as in FIG. 1, there are N×K=K (N=1) AICs 21-1-1, 21-1-2, . . . , 21-1-K with K adaptive filter blocks 28-1-1, 28-1-2, . . . , 28-1-K. Thus, instead of one DOA signal (signal 17 in FIG. 1) the speaker and noise tracking block 16 generates K DOA signals 17-1, 17-2, . . . , 17-K which are sent to the corresponding K beam shape control blocks 22-1, 22-2, . . . , 22-K. The K beam shape control blocks 22-1, 22-2, . . . , 22-K generate and provide K target control signals 35-1, 35-2, . . . , 35-K to the corresponding K target post-filters 24-1, 24-2, . . . , 24-K and N×K=K (N=1) noise control signals 36-1-1, 36-1-2, . . . , 36-1-K to the corresponding K noise post-filters 25-1-1, 25-1-2, . . . , 25-1-K, respectively. The K target post-filters 24-1, 24-2, . . . , 24-K and the corresponding K noise post-filters 25-1-1, 25-1-2, . . . 25-1-K generate and send K target signals 38-1, 38-2, . . . , 38-K and corresponding K noise reference signals 37-1-1, 37-1-2, . . . , 37-1-K to corresponding K adders 26-1, 26-1, . . . , 26-K and to corresponding K adaptive filter blocks 28-1-1, 28-1-2, . . . , 28-1-K, respectively. Thus, there are K system output target signals 42-1, 42-2, . . . , 42-K, each generated in a similar way as the output target signal 42 in FIGS. 1 and 3. Further processing of the K output target signals 42-1, 42-2, . . . , 42-K can include combining or intermixing them (whatever application requires) using additional components such as a mixer and/or a conference switch/bridge technologies which are well-known in the art.

What is claimed is:

1. A method, comprising:

providing M microphone signals or M digital microphone signals in response to an acoustic signal, wherein M is a finite integer of at least a value of two;

generating each of T+1 intermediate signals in response to the M microphone signals or to M digital microphone signals and providing said T+1 intermediate signals to each of one or more noise post-filters of a beamformer wherein the beamformer is a polynomial beamformer having predetermined beam shape filter characteristics in response to noise control signals, wherein T is a finite integer of at least a value of one and the T+1 intermediate signals contain spatial information of the M microphone signals or M digital microphone signals;

generating N noise control signals by each of one or more beam shape control blocks of the beamformer and providing each of said N noise control signals to a corresponding one of the one or more noise post-filters, wherein N is a finite integer of at least a value of one; and generating each of one or more noise reference signals by the corresponding one of the one or more noise post-filters and providing each of said one or more noise reference signals to a corresponding one of one or more adaptive filter blocks of one or more adaptive interference cancellers, for providing one or more output target signals for generalized sidelobe canceling and the number of said M microphone signals or M digital microphone signals, said T+1 intermediate signals and said noise post-filters are independent of each other.

2. The method of claim 1, wherein prior to the generating the T+1 intermediate signals, the method further comprises the:

converting the M microphone signals of the microphone array to the M digital microphone signals and providing said M digital microphone signals to the beamformer.

3. The method of claim 1, further comprising:

generating one or more direction of arrival signals or one or more external direction of arrival signals and optionally one or more noise direction signals or one or more external direction signals and providing said one or more direction of arrival signals or said one or more external direction of arrival signals and optionally said one or more noise direction signals or one or more external direction signals to the one or more beam shape control blocks.

4. The method of claim 3, wherein the generating the T+1 intermediate signals also comprises providing said T+1 intermediate signals to a speaker and noise tracking block.

5. The method of claim 4, wherein the one or more direction of arrival signals and optionally said one or more noise direction signals are generated and provided to the one or more beam shape control blocks by the speaker and noise tracking block.

6. The method of claim 3, wherein the one or more external direction of arrival signals and optionally the one or more external noise direction signals are generated and provided to the one or more beam shape control block by an external control signal generator.

7. The method of claim 1, wherein after the generating the T+1 intermediate signals, further comprising:

generating one or more direction of arrival signals and optionally one or more noise direction signals by a speaker and noise tracking block and providing said one or more direction of arrival signals and optionally said one or more noise direction signals to the one or more beam shape control blocks.

8. The method of claim 1, wherein the generating said T+1 intermediate signals further comprises providing said T+1 intermediate signals to each of one or more target post-filters and wherein the generating the N noise control signals further comprises generating a target control signals by each of the one or more beam shape control blocks and providing said target control signal to a corresponding one of the one or more target post filters, said method further comprises:

generating one or more target signals by the one or more target post-filters and providing said one or more target signals to one or more adders of the one or more adaptive interference cancellers.

9. The method of claim 8, further comprising:

generating one or more noise cancellation adaptive signals by the one or more adaptive filter blocks and providing said one or more noise cancellation adaptive signals to the one or more adders; and generating the one or more output target signals using the one or more adders by subtracting each of the one or more noise cancellation adaptive signals from a corresponding one of the one or more target signals.

10. The method of claim 9, wherein each of the one or more output target signals is provided to corresponding one or more of the one or more adaptive filter blocks for continuing an adaptation process and for generating further values of the one or more output target signals.

11. The method of claim 1, wherein the beamformer is a polynomial beamformer.

12. The method of claim 1, wherein N=1.

13. The method of claim 1, wherein the generalized sidelobe canceling is performed in a frequency domain, or in a time domain or in both the frequency and the time domain.

14. A generalized sidelobe canceling system, comprising:

a beamformer, wherein the beamformer is a polynomial beamformer, responsive to M microphone signals or to M digital microphone signals, configured to generate T+1 intermediate signals, configured to generate one or more noise control signals and for providing one or more noise reference signals, having predetermined beam shape filter characteristics in response to noise control signals and a polynomial filter characteristic which is controlled by adjusting variable filter parameters, wherein T is a finite integer of at least a value of one, M is a finite integer of at least a value of two and the T+1 intermediate signals contain spatial information of the M microphone signals or M digital microphone signals;

one or more adaptive interference cancellers, responsive to the one or more noise reference signals, configured to provide one or more output target signals of the generalized sidelobe canceling system wherein the number of said M microphone signals or M digital microphone signals, said T+1 intermediate signals and said noise control signals are independent of each other.

15. The generalized sidelobe canceling system of claim 14, wherein the beamformer is a polynomial beamformer.

16. The generalized sidelobe canceling system of claim 14, further comprising:

an A/D converter, responsive to the M microphone signals, for providing the M digital microphone signals.

17. The generalized sidelobe canceling system of claim 14, wherein the beamformer comprises:

one or more beam shape control blocks, each responsive to a corresponding one of one or more direction of arrival signals or to a corresponding one of one or more of external direction of arrival signals and optionally to a corresponding one of one or more of noise direction signals or to a corresponding one of one or more of external noise direction signals, each configured to provide a target control signal and N noise control signals, wherein N is a finite integer of at least a value of one.

18. The generalized sidelobe canceling system of claim 17, wherein N=1.

19. The generalized sidelobe canceling system of claim 17, wherein the beamformer further comprises:

T+1 pre-filters, each responsive to each of the M digital microphone signals, configured to provide the T+1 intermediate signals.

20. The generalized sidelobe canceling system of claim 19, further comprising:

a speaker and noise tracking block, responsive to the T+1 intermediate signals, configured to provide the one or more direction of arrival signals and optionally the one or more noise direction signals.

21. The generalized sidelobe canceling system of claim 19, wherein the beamformer further comprises:

one or more target post filters, each responsive to the T+1 intermediate signals and to the target control signal, configured to provide a target signal; and one or more noise post-filters, each responsive to the T+1 intermediate signals and to a corresponding one of the one or more noise control signals, each configured to provide a corresponding one of the one or more noise reference signals.

22. The generalized sidelobe canceling system of claim 17, further comprising:

an external control signal generator, configured to provide the one or more external direction of arrival signals and optionally the one or more external noise direction signals.

23. The generalized sidelobe canceling system of claim 14, wherein the adaptive interference canceller comprises:

one or more adaptive filter blocks, each responsive to a corresponding one of the one or more noise reference signals and to the one or more output target signals, each configured to provide a corresponding one of one or more noise cancellation adaptive signals; and one or more adders, each responsive to a corresponding one of one or more target signals and to a corresponding one of the one or more noise cancellation adaptive signals, each configured to provide a corresponding one of the one or more output target signals.

24. The generalized sidelobe canceling system of claim 14, wherein said system is implemented in a frequency domain, or in a time domain or in both the frequency and the time domain.

25. A generalized sidelobe canceling system of claim 14, further comprising a microphone array containing M microphones, responsive to an acoustic signal, configured to provide the M microphone signals.

26. A generalized sidelobe canceling system, comprising:

means for polynomial beamforming, responsive to M microphone signals or to M digital microphone signals, configured to generate T+1 intermediate signals, configured to generate one or more noise control signals, configured to generate a target signal and one or more noise reference signals, wherein T is a finite integer of at least a value of one, M is a finite integer of at least a value of two and the T+1 intermediate signals contain spatial information of the M microphone signals or M digital microphone signals, wherein the number of said M microphone signals or M digital microphone signals, said T+1 intermediate signals and said noise post-filters are independent of each other; and one or more means for adaptive interference cancellation, responsive to the target signal and the one or more noise reference signals, configured to provide one or more output target signals of the generalized sidelobe canceling system.

27. The generalized sidelobe canceling system of claim 26, further comprising:

means for detecting acoustic signals containing M microphones, responsive to an acoustic signal, for providing the M microphone signals; and means for converting, responsive to the M microphone signals, for providing the M digital microphone signals.

* * * * *

UNITED STATES PATENT AND TRADEMARK OFFICE

CERTIFICATE OF CORRECTION

PATENT NO. : 7,778,425 B2
APPLICATION NO. : 10/745945
DATED : August 17, 2010
INVENTOR(S) : Matti Kajala, Matti Hämäläinen and Ville Myllylä

It is certified that error appears in the above-identified patent and that said Letters Patent is hereby corrected as shown below:

In column 5, after line 17, the following paragraph should be inserted:

--According to a fourth aspect of the invention, a computer program product comprises a computer readable storage structure embodying computer program code thereon for execution by a computer processor with the computer program code. The computer program code comprises instructions for performing a method. The method comprises providing M microphone signals or M digital microphone signals in response to an acoustic signal, wherein M is a finite integer of at least a value of two; generating each of T+1 intermediate signals in response to the M microphone signals or to M digital microphone signals and providing said T+1 intermediate signals to each of one or more noise post-filters of a beamformer having a predetermined beam shape filter characteristics in response to noise control signals, wherein T is a finite integer of at least a value of one; generating N noise control signals by each of one or more beam shape control blocks of the beamformer and providing each of said N noise control signals to a corresponding one of the one or more noise post-filters, wherein N is a finite integer of at least a value of one; and generating each of one or more noise reference signals by the corresponding one of the one or more noise post-filters and providing each of said one or more noise reference signals to a corresponding one of one or more adaptive filter blocks of one or more adaptive interference cancellers, for providing one or more output target signals for generalized sidelobe cancelling.--

Signed and Sealed this
Eleventh Day of January, 2011

David J. Kappos
*Director of the United States Patent and Trademark Office*